(12) United States Patent
Linsky

(10) Patent No.: US 9,398,046 B2
(45) Date of Patent: Jul. 19, 2016

(54) IMAGE-BASED MAN-IN-THE-MIDDLE PROTECTION IN NUMERIC COMPARISON ASSOCIATION MODELS

(75) Inventor: Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1562 days.

(21) Appl. No.: 12/043,916

(22) Filed: Mar. 6, 2008

(65) Prior Publication Data

US 2009/0228707 A1 Sep. 10, 2009

(51) Int. Cl.
*H04L 29/06* (2006.01)
*G06F 21/31* (2013.01)
*H04W 12/06* (2009.01)
*H04W 12/12* (2009.01)
*H04W 88/02* (2009.01)

(52) U.S. Cl.
CPC ............ *H04L 63/1475* (2013.01); *G06F 21/31* (2013.01); *H04L 63/1466* (2013.01); *H04W 12/06* (2013.01); *H04W 12/12* (2013.01); *G06F 2221/2129* (2013.01); *H04W 88/02* (2013.01)

(58) Field of Classification Search
USPC .............. 713/171; 380/270, 283; 707/999.004
See application file for complete search history.

(56) References Cited

U.S. PATENT DOCUMENTS

| 6,282,362 | B1 * | 8/2001 | Murphy et al. | 386/224 |
|---|---|---|---|---|
| 7,177,426 | B1 * | 2/2007 | Dube | 380/46 |
| 7,734,930 | B2 * | 6/2010 | Kirovski et al. | 713/184 |
| 8,621,210 | B2 * | 12/2013 | Bussard et al. | 713/168 |
| 2002/0023216 | A1 * | 2/2002 | Noguchi et al. | 713/171 |
| 2003/0014637 | A1 * | 1/2003 | Ellison et al. | 713/178 |
| 2004/0025017 | A1 * | 2/2004 | Ellison et al. | 713/168 |
| 2004/0230843 | A1 * | 11/2004 | Jansen | 713/202 |

(Continued)

FOREIGN PATENT DOCUMENTS

| CN | 1961527 A | 5/2007 |
|---|---|---|
| JP | 11055251 A | 2/1999 |

(Continued)

OTHER PUBLICATIONS

Bluetooth, Special Interest Group. "Simple Pairing Whitepaper", revision v10r00. (2006).*

(Continued)

*Primary Examiner* — Vikkram Bali
*Assistant Examiner* — Tracy Mangialaschi
(74) *Attorney, Agent, or Firm* — Won Tae C. Kim

(57) ABSTRACT

An authentication scheme is provided for securely establishing an association with a second device over a wireless communication link. A cryptographic key exchange is performed between a first device and a second device, wherein cryptographic information for the first and second device is obtained. The first and second devices may independently generate a confirmation value based on the cryptographic information. Each device may obtain a confirmation image based on their respective confirmation values. A confirmation image is uniquely associated with a confirmation value so that no two confirmation values can be associated with the same confirmation image. The images for both the first and second devices are provided to an operator for authentication. If the confirmation images are identical, an association between the first and second devices may be confirmed by the operator. Comparing confirmation images may increase the reliability of operator authentication and is more efficient than comparing values.

44 Claims, 10 Drawing Sheets

(56) References Cited

U.S. PATENT DOCUMENTS

| | | | |
|---|---|---|---|
| 2005/0265547 A1* | 12/2005 | Strasser et al. | 380/44 |
| 2005/0283609 A1* | 12/2005 | Langford | 713/176 |
| 2006/0020812 A1* | 1/2006 | Steinberg et al. | 713/181 |
| 2006/0090073 A1* | 4/2006 | Steinberg et al. | 713/170 |
| 2006/0115111 A1* | 6/2006 | Malone et al. | 382/100 |
| 2006/0120607 A1* | 6/2006 | Lev | 382/217 |
| 2006/0218636 A1* | 9/2006 | Chaum | 726/22 |
| 2007/0092075 A1* | 4/2007 | Laih et al. | 380/30 |
| 2007/0189527 A1* | 8/2007 | Brown et al. | 380/44 |
| 2007/0201721 A1* | 8/2007 | Malone et al. | 382/100 |
| 2007/0233860 A1* | 10/2007 | Lillie et al. | 709/225 |
| 2007/0255959 A1* | 11/2007 | Jung et al. | 713/183 |
| 2008/0175377 A1* | 7/2008 | Merrill | 380/30 |
| 2008/0219495 A1* | 9/2008 | Hulten et al. | 382/100 |
| 2008/0229109 A1* | 9/2008 | Gantman et al. | 713/176 |
| 2008/0312512 A1* | 12/2008 | Brukalo et al. | 600/300 |
| 2009/0150968 A1* | 6/2009 | Ozzie et al. | 726/1 |
| 2010/0017602 A1* | 1/2010 | Bussard et al. | 713/168 |

FOREIGN PATENT DOCUMENTS

| | | |
|---|---|---|
| JP | 2002026899 A | 1/2002 |
| JP | 2002366516 A | 12/2002 |
| JP | 2005520395 A | 7/2005 |
| JP | 2005535185 A | 11/2005 |
| JP | 2006054895 A | 2/2006 |
| JP | 2006526314 A | 11/2006 |
| WO | WO-03077470 A1 | 9/2003 |
| WO | WO-2004012408 A2 | 2/2004 |
| WO | 2004098145 A1 | 11/2004 |
| WO | WO2006107513 A2 | 10/2006 |

OTHER PUBLICATIONS

International Search Report and Written Opinion—PCT/US2009/036430, International Search Authority—European Patent Office—Aug. 31, 2009.

Okamoto, T., "Cipher: Scheme for Fairly Playing Online Games," Internet Security (6), Nikkei Electronics, Japan, Nikkei Business Publishing, Mar. 24, 1997, No. 685, pp. 203-208.

Taiwan Search Report—TW098107420—TIPO—Jul. 10, 2013.

* cited by examiner

IMAGE-BASED MAN-IN-THE-MIDDLE PROTECTION IN NUMERIC COMPARISON ASSOCIATION MODELS

BACKGROUND

1. Field

At least one feature relates to pairing and authenticating network devices communicating in wireless networks, and, more particularly, to using images, icons and/or, optionally, sounds in comparison association models implemented in protection schemes against the man-in-the middle attacks for a wireless device authentication.

2. Background

In wireless communication systems, secure communications between participating communications units may be accomplished by processes of pairing and authentication. Many wireless technologies implement cryptographic key exchange mechanisms that provide the participating communications units with exchanged and shared secret information confirming that the correct devices are connected.

A general problem that may occur with such key exchange mechanisms is that it may be exposed to a man-in-the-middle (MITM) attack, i.e., a security breach in which a malicious user may intercept and/or alter the messages between two communication devices. For instance, during a cryptographic key exchange between two communication devices, an intruder in a MITM attack may obtain one or more cryptographic keys during the key exchange which it can use to obtain access to information transmitted between two devices. To protect against MITM attacks, some prior art authentication methods may implement a numeric comparison protocol in which numeric confirmation values are separately calculated by the two communicating devices. The numeric confirmation values may then be either displayed on both devices to be compared by a user, or an instance of a confirmation value may be calculated by one device and entered into the other device for comparison or verification with another instance of the confirmation value.

Bluetooth wireless technology, Wi-Fi, Certified Wireless USB (CW-USB) wireless technologies provide implementations for wireless communications network systems. Bluetooth, for example allows connecting personal devices in an ad-hoc fashion. The Bluetooth standard (see "Specification of the Bluetooth System, Core, Version 2.1+EDR", Jul. 27, 2007) comprises a number of security mechanisms to ensure that a device which a user intends to add is the device that is added and help avoid accidentally or intentionally adding unintended devices. In particular, the Bluetooth specification provides a secure simple pairing and authentication mechanism which includes a public key exchange and a numeric comparison protocol to protect against active MITM attacks. The public key exchange may serve to establish a shared secret that may be used to secure communications. The numeric comparison protocol allows a user to authenticate confirmation values on two devices to verify that a communication link or association is between two intended devices and not an intruding device.

For purposes of authentication, some wireless technologies (e.g., Bluetooth 2.0, Wi-Fi Protected Access WPA/WPA2 and earlier) use a fixed label or sticker posted on a device (or other means, such as a manual that accompanies a device) to provide a private identification number (PIN) to the user. The user may enter the PIN, or push a button, to enable data encryption for authentication. Other technologies (e.g., Bluetooth Core Specification version 2.1+EDR, CW-USB, Wi-Fi Protected Setup) are starting to move to association models that implement greater protection against active MITM attacks. Typically, the MITM protection involves displaying an N digit number (typically between two and six digits) on both devices and requesting confirmation from the user. The Bluetooth Core Specification Version 2.1+EDR provides association models where the user is requested to verify six decimal digits on each device. CW-USB has a similar mechanism to Bluetooth 2.1, but uses fewer digits for comparison. The Wi-Fi Alliance's Protected Setup configuration also uses a numeric comparison where a dynamic PIN can be generated and shown on the device's display to be compared to the PIN provided by the added devices.

A limitation of using PINs, numeric confirmation values, and/or other forms of numeric and/or alpha-numeric sequences is that digits zero (0) through nine (9) do not provide a lot of information per character. Although numeric comparison protocols used in the some technologies have simplified the authentication process for the user, as the user is not required to remember a fixed PIN or number, or create and enter a new PIN on two devices, some users may still find comparing the two numeric confirmation values cumbersome. Additionally, a numeric (or even alpha-numeric) comparison protocol is not effective or efficient where the wireless network connections involve communications in different basic languages (e.g., Chinese, Arabic, Japanese, Hebrew, Greek, etc.). Consequently, there is a need to improve the reliability and ease of comparison of the confirmation values generated in a numeric comparison protocol for MITM protection.

SUMMARY

A feature is provided for enabling a user to quickly and obviously confirm an authentication pairing by using an image (e.g., one or more icons, pictures, symbols, colors, etc.), instead of numbers or alpha-numerical of a numeric comparison protocol. The use of images potentially conveys more information while making it easier for users to compare than a sequence of numbers or letters. As a result of using images, the usability of a device may be improved since it facilitates authentication and/or pairing models such as those used to provide protection against man-in-the-middle attacks when establishing an association or link with another device.

A method operational on a first device is provided for securely establishing an association with a second device over a wireless communication link. A cryptographic key exchange is performed with a second device, wherein cryptographic information for the first and second device is obtained. In one example, the cryptographic information may include at least one of a first public key associated with the first device, a first nonce associated with the first device, a second public key associated with the second device, and a second nonce associated with the second device. A confirmation value is obtained for the first device based on the cryptographic information. For example, the confirmation value may include at least one of a numeric value having a plurality of digits and an alpha-numeric sequence. A confirmation image is then obtained or generated based on the confirmation value. The confirmation image may be formed from a plurality of images (e.g., at least one of icons, graphics, symbols, color, and sounds). For instance, a plurality of images may be stored in the first device, wherein the confirmation value is converted into the confirmation image by mapping one or more digits of the confirmation value to one or more of the plurality of images. The confirmation image is uniquely associated with the confirmation value.

The confirmation image is then provided to an operator for authentication against a corresponding confirmation image for the second device. Providing the confirmation image to the operator for authentication may include presenting the image on a display of the first device. In response to sending providing the confirmation image to the operator, the first device may receive feedback from the operator on whether to accept or decline association with the second device. The first device may accept an association with the second device if the feedback indicates that the confirmation image is the same as the corresponding confirmation image in the second device. Otherwise, the first device may decline an association with the second device if the feedback indicates that the confirmation image is different as the corresponding confirmation image in the second device.

In one example, obtaining the confirmation image based on the confirmation value may further comprise selecting one or more images from the plurality of images stored in the first device.

In another example, an image generation algorithm may be stored in the first device, wherein the confirmation value is converted into the confirmation image by using the image generation algorithm. The image generation algorithm may combine one or more images, icons, colors, shapes, sounds, and backgrounds to generate the confirmation image.

In some implementations, the confirmation image may be based on a first derivative of the confirmation value. In some implementations, obtaining the confirmation image based on the confirmation value may include applying a collision-resistant function to generate the confirmation image, wherein the collision-resistant function inhibits generating the same image using different values.

In one implementation, the first device may include a Bluetooth-compliant communication interface used for the cryptographic key exchange with the second device.

In one implementation, obtaining a confirmation image based on the confirmation value may include (a) mapping the confirmation value to a longitude and latitude pair; and/or (b) obtaining at least one of a map or image of a location associated with the longitude and latitude pair, and use the map or image of the location as the confirmation image.

In another implementation, obtaining a confirmation image based on the confirmation value may include (a) converting the confirmation value into a search string; (b) inputting the search string into a search engine to obtain one or more search results including a plurality of webpages; and/or (c) utilizing a webpage in the search results as the confirmation image. The search engine may operate on an external network and the plurality of webpages are accessible via the external network.

In yet another implementation, obtaining a confirmation image based on the confirmation value may include (a) converting the confirmation value into an address reference for content on a network, wherein content includes an image; (b) obtaining an image associated with the address reference; and/or (c) utilizing the image as the confirmation image.

A device is also provided for securely establishing an association with a second device over a wireless communication link. The device may include a wireless communication interface and an authentication module. The wireless communication interface may serve to communicate with the second device. The authentication module may be configured to (a) perform a cryptographic key exchange with the second device, wherein cryptographic information for the device and second device is obtained; (b) obtain a confirmation value based on the cryptographic information; (c) obtain a confirmation image based on the confirmation value; and/or (d) provide the confirmation image to an operator over an output interface for authentication against a corresponding confirmation image for the second device.

The device may also include an input interface coupled to the authentication module, the input interface for receiving feedback from the operator on whether to accept or decline association with the second device. The authentication module may be further configured to (a) accept an association with the second device if the feedback indicates that the confirmation image is the same as the corresponding confirmation image in the second device; and/or (b) decline an association with the second device if the feedback indicates that the confirmation image is different than the corresponding confirmation image in the second device.

The device may also include a storage device for storing a plurality of images, wherein the confirmation value is converted into the confirmation image by mapping one or more digits of the confirmation value to one or more of the plurality of images. The authentication module may be further configured to select one or more images from the plurality of images stored in the first device to obtain the confirmation image.

The device may also include an image generator coupled to the authentication module, wherein the image generator is configured to convert the confirmation value into the confirmation image. The image generator may combine one or more images, icons, colors, shapes, sounds, and backgrounds to generate the confirmation image.

In some implementations, the confirmation image may be uniquely associated with the confirmation value. The confirmation image may be formed from a plurality of images. The confirmation image may be based on a first derivative of the confirmation value. The confirmation image includes at least one of icons, graphics, symbols, color, and sounds. The cryptographic information may include at least one of a first public key associated with the first device, a first nonce associated with the first device, a second public key associated with the second device, and a second nonce associated with the second device. The communication interface may include a Bluetooth-compliant communication interface used for the cryptographic key exchange with the second device. The output interface may include at least one of a display for visually presenting the confirmation image to the operator and a speaker for audibly providing the image to the operator.

Consequently, a device is provided comprising: (a) means for communicating with a second device; (b) means for performing a cryptographic key exchange with the second device, wherein cryptographic information for the device and second device is obtained; (c) means for obtaining a confirmation value based on the cryptographic information; (d) means for obtaining a confirmation image based on the confirmation value; (e) means for providing the confirmation image to an operator over an output interface for authentication against a corresponding confirmation image for the second device; (f) means for receiving feedback from the operator on whether to accept or decline association with the second device; (g) means for accepting an association with the second device if the feedback indicates that the confirmation image is the same as the corresponding confirmation image in the second device; (h) means for declining an association with the second device if the feedback indicates that the confirmation image is different than the corresponding confirmation image in the second device; (i) means for storing a plurality of images, wherein the confirmation value is converted into the confirmation image by mapping one or more digits of the confirmation value to one or more of the plurality of images; and/or (j) means for converting the confirmation value into the confirmation image.

A computer program operational on a first device is provided for securely establishing an association with a second device over a wireless communication link, which when executed by a processor causes the processor to: (a) perform a cryptographic key exchange with the second device, wherein cryptographic information for the device and second device is obtained; (b) obtain a confirmation value based on the cryptographic information; (c) obtain a confirmation image based on the confirmation value; (d) provide the confirmation image to an operator over an output interface for authentication against a corresponding confirmation image for the second device; (e) receive feedback from the operator on whether to accept or decline association with the second device; (f) accept an association with the second device if the feedback indicates that the confirmation image is the same as the corresponding confirmation image in the second device; (g) decline an association with the second device if the feedback indicates that the confirmation image is different than the corresponding confirmation image in the second device; (h) store a plurality of images, wherein the confirmation value is converted into the confirmation image by mapping one or more digits of the confirmation value to one or more of the plurality of images; and/or (i) convert the confirmation value into the confirmation image. The confirmation image is uniquely associated with the confirmation value A processing circuit is also provided for securely establishing an association with a second device over a wireless communication link, the processing circuit adapted to (a) perform a cryptographic key exchange with the second device, wherein cryptographic information for the device and second device is obtained; (b) obtain a confirmation value based on the cryptographic information; (c) obtain a confirmation image based on the confirmation value; (d) provide the confirmation image to an operator over an output interface for authentication against a corresponding confirmation image for the second device; (e) receive feedback from the operator on whether to accept or decline association with the second device; (f) accept an association with the second device if the feedback indicates that the confirmation image is the same as the corresponding confirmation image in the second device; (g) decline an association with the second device if the feedback indicates that the confirmation image is the different than the corresponding confirmation image in the second device; (h) store a plurality of images, wherein the confirmation value is converted into the confirmation image by mapping one or more digits of the confirmation value to one or more of the plurality of images; and/or (i) convert the confirmation value into the confirmation image. The confirmation image may be uniquely associated with the confirmation value.

DETAILED DESCRIPTION

Figure 1:
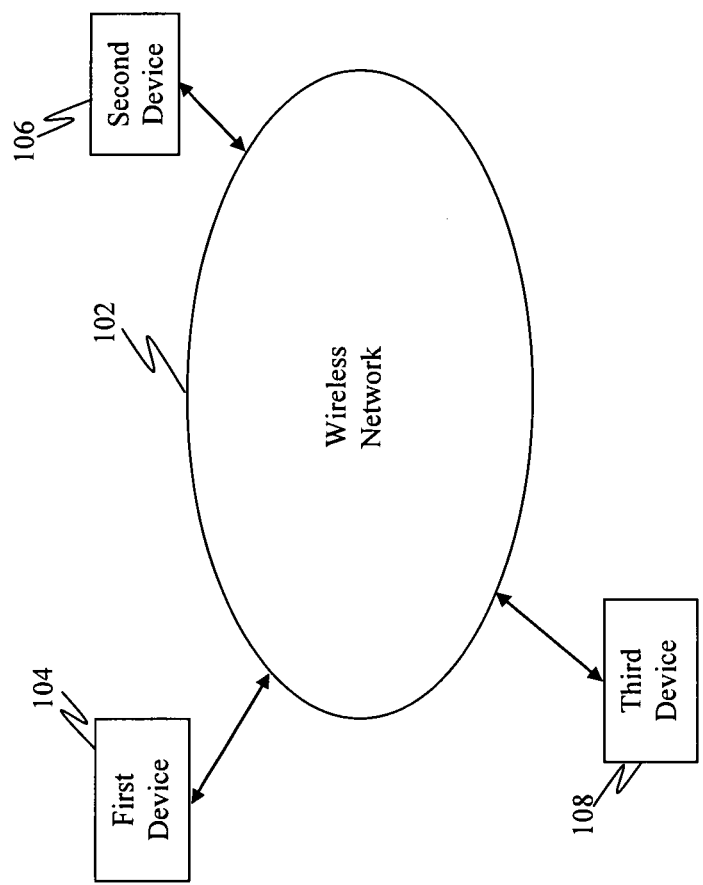
FIG. 1 is a block diagram illustrating a wireless communication network in which a pairing and/or authentication model based on comparison of images may be implemented.

In the following description, specific details are given to provide a thorough understanding of various features. However, it will be understood by one of ordinary skill in the art that these features may be practiced without these specific details. For example, circuit details may not be shown in block diagrams in order to not obscure the examples or configurations illustrated therein.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, configurations may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

In the following description, certain terminology is used to describe certain features. The term "key" (e.g., cryptographic key, authentication key) refers to a certificate, identifier, cryptograph, or other types of numeric, alpha-numeric, and/or symbols. The term "image" (e.g., icon, symbol, graphic, authentication image) refers to a black and white, color, and/or grayscale visual representation including, but not limited to one or more graphics, icons, hieroglyphs, alpha-numeric objects, symbols, and/or pictures, etc., as well as audio, sound, and/or tones. The term "image" may refer to one image or a plurality of images.

One feature provides an improved way for enabling a user to quickly and obviously confirm an authentication pairing by using images (e.g., icons, pictures, symbols, colors, etc.), instead of numbers or alpha-numerical of a numeric comparison protocol. The use of images potentially conveys more information while making it easier for users to compare than a sequence of numbers or letters. As a result of using images, the usability of a device may be improved since it facilitates authentication and/or pairing models such as those used to provide protection against man-in-the-middle attacks when establishing an association or link with another device.

FIG. 1 is a block diagram illustrating a wireless communication network 102 in which a pairing and/or authentication model based on comparison of images may be implemented. In one example, short-range wireless communications may be implemented in the network 102 using Bluetooth wireless technology, a wireless communications technology operating in the unlicensed ISM (Industrial, Scientific and Medical) frequency band at 2.45 GHz which provides approximately 83.5 MHz of radio spectrum. Bluetooth wireless technology allows communicatively connecting devices within that spectrum in an ad-hoc fashion in so-called piconets. Each device can simultaneously communicate with a plurality of other devices within a single piconet. Each device can also belong to several piconets simultaneously. Piconets are established dynamically and automatically as Bluetooth-enabled devices enter and leave radio proximity.

The wireless communication network 102 may include a plurality of communication devices (e.g., headsets, mobile phones, computers, and/or any device having communication capabilities), designated in this example as a first device 104, a second device 106, and a third device 108. Communications in the wireless communication network 102 between the first device 104, the second device 106, and/or the third device 108 may be accomplished via radio frequency, optically, magnetically, inductively, and/or capacitively, for example, and include connections, communication links, and/or associations between various devices. For instance, a wireless headset may communicate with a mobile phone, two mobile phones may communicate with each other, a mobile phone may communicate with a personal computer, a mobile phone may communicate with a landline telephone, etc.

Typically, in a communication link or association between two devices, one device may act as the "initiator", and the other device may act as the "non-initiator" or "responder". The initiator device may be the one from which the initial the communication link or association setup takes place. However, a device may function as an initiator for one communication link or association while functioning as a non-initiator/responder for other communication links or associations. For instance, in the wireless communication network 102, the first device 104 may function as the initiator for a communication link with the second device 106, but may function as a non-initiator in a communication link with the third device 108.

The Bluetooth Core Specification comprises a number of security mechanisms including numeric comparison association models. In a numeric comparison association model, a secure simple pairing authentication protocol is provided where two devices perform a cryptographic key exchange which is used to derive numeric confirmation values that are displayed to the user for verification to protect against a MITM attack.

A man-in-the-middle (MITM) attack occurs when a user wants to connect two devices but instead of connecting directly with each other they unknowingly connect to a third (attacking/intruder) device that plays the role of the device they are attempting to pair with. The third device then relays information between the two devices giving the illusion that they are directly connected. The attacking device may eavesdrop on communication between the two devices (known as active eavesdropping) and is able to insert and modify information on the connection. In this type of attack, all of the information exchanged between the two devices is compromised and the attacker may inject commands and information into each of the devices thus potentially damaging the function of the devices.

The Bluetooth MITM protection methods are based on the assumption that, if a man-in-the-middle is present in the cryptographic key exchange, then the numeric confirmation values will be different in the legitimate devices within the probability of $10^{-number\_of\_digits}$. For example, if the numeric confirmation value is 6 digits, the probability that the man-in-the-middle will generate the same confirmation value is 1 in 1,000,000. The Bluetooth Core Specification applies a cryptographic key exchange (e.g., public/private key exchange) based on the Diffie-Hellman key exchange protocol. According to this protocol, each device has a private key (also known as a secret key), derives a public key from that private key, and sends the public key to the other device. A shared secret key may be generated by each device from its private key and/or the corresponding received public key of the other device, where the shared secret key is used to secure communications between the devices. Each device may also derive a numeric confirmation value based on one or more of the cryptographic keys. The numeric confirmation values may be displayed by each device to allow a user to compare them and confirm or decline a communication link or association. If the numeric confirmation values are the same, then the user may confirm the communication link or association between the two devices. If a man-in-the-middle is present in the cryptographic key exchange, then the numeric confirmation values may be different in the two legitimate devices and the user may decline the communication link or association between the two devices.

Secure association models that are comparable to the Bluetooth Core Specification Version 2.1+EDR and that involve numeric comparisons are available from Wi-Fi Protected Setup for Wi-Fi Certified products, Certified Wireless USB, and other wireless technologies. In the authentication models for these technologies, devices may have a display to implement the numeric association models and be capable of displaying from two (2) to sixteen (16) digit numeric confirmation values to the user.

Figure 2:
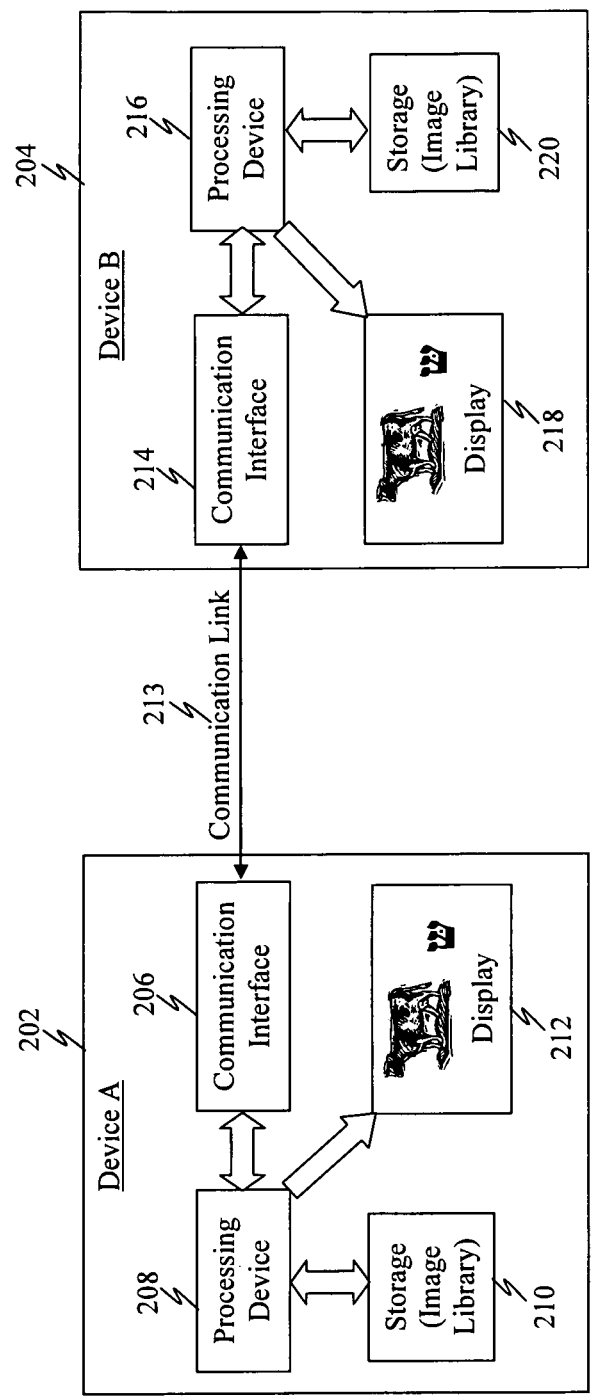
FIG. 2 illustrates block diagrams of devices that may be configured to establish a secure communication link or association facilitated by image-based authentication.

FIG. 2 illustrates block diagrams of devices that may be configured to establish a secure communication link or association facilitated by image-based authentication. In this example, device A 202 may include a processing device 208 (e.g., processing circuit, processor, computer, etc.) coupled to a communication interface 206, a storage device 210, and/or a display 212. Similarly, device B 204 may also include a processing device 216 coupled to a communication interface 214, a storage device 220, and/or a display 218. The communication interfaces 206 and/or 214 may enable devices A 202 and B 204 to communicate with each other over a wireless or wired communication link 213. For example, communication interfaces 206 and 214 may be Bluetooth-compliant interfaces that facilitate short-range ad-hoc communications. The processing devices 208 and 216 may be configured to perform a cryptographic key exchange (e.g., public-private key exchange) to secure the communication link and/or authenticate each other. Processing devices 208 and 216 may perform the calculations to compute shared secret keys based on the cryptographic key exchange between device A 202 and device B 204.

To prevent or deter man-in-the-middle attacks during the cryptographic key exchange (e.g., public-private key exchange), the processing devices 208 and/or 216 may be further configured or adapted to allow a user to visually and/or audibly confirm the security of the communication link 213 using a pairing and/or authentication association model. For instance, the processing devices 208 and 216 may perform computations based the cryptographic key exchange to obtain numeric confirmation values. However, comparing a numeric and/or alpha-numeric sequence of characters (e.g., numbers and/or letters) is cumbersome and prone to mistakes if the check values are similar but not identical. Consequently, rather than having the user compare the numeric confirmation values on the two devices 202 and 204, the confirmation values may be mapped or converted to one or more images that can then be more easily and obviously compared by the user. In one example, the one or more images may be obtained by converting the numeric confirmation values into one or more images, such as icons, pictures, colors, sounds, avatars, symbols, etc., for easier and faster user recognition.

In one example, device A 202 may map numeric confirmation values as one or more images (e.g., pre-stored in the storage device 210) and then displays the mapped images on the display 212. Similarly, device B 204 may also map numeric confirmation values as one or more images (e.g., pre-stored in the storage device 220) and then displays the mapped images on the display 218. In various implementations, the mapped images may be selected from a plurality of pre-stored images in an image library and/or may be generated by one or more image-generating algorithms. The one or more images displayed to the user for verification may uniquely correspond to the numeric confirmation value calculated by each of the processing devices 208 and 214. In some implementations, a collision-resistant function may be used to generate a particular image associated with a specific confirmation value and inhibit generating the same image using other values.

If the images displayed by the devices 202 and 204 are the same, then the user may accept the device association. Otherwise, if the images are different, the cryptographic key exchange may have been exposed to a man-in-the-middle attack and the user can reject the association and/or communication link between the devices.

A confirmation value, e.g., sequence of numbers or alpha-numeric sequence of any length, may be represented by one or more images. For example, a six (6) digit number may be mapped into two images or icons, where each image or icon represents a three digit number. Consequently, a library of one thousand images or icons may serve to map any six digit number. For a higher degree of security in view of a MITM attack, numeric confirmation values significantly longer than six-digits may be used. Additionally, more than one image library may be used on a single communication device.

Figure 3:
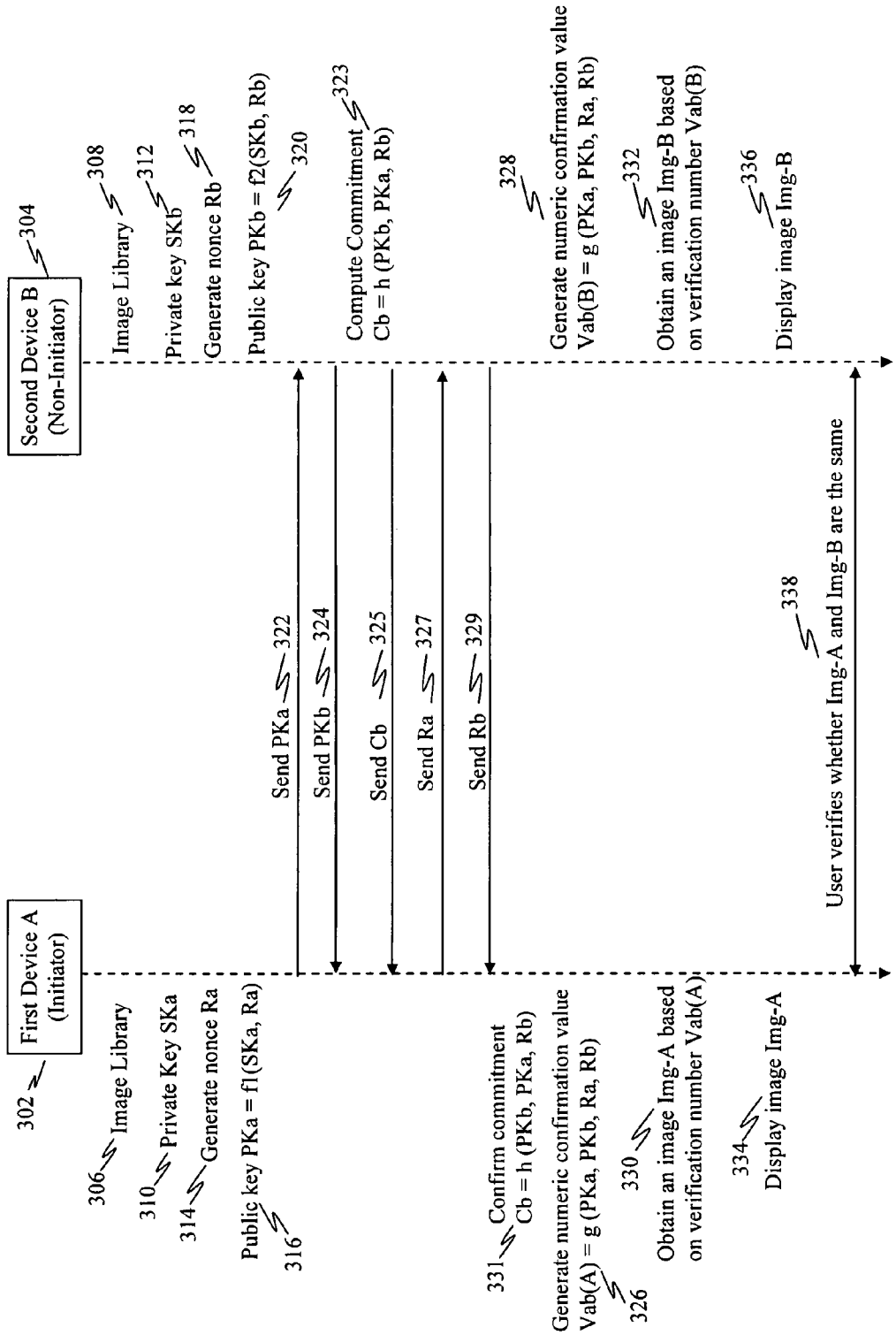
FIG. 3 is a flow diagram illustrating how two devices may establish a secure association or communication link using image-based authentication by a user.

FIG. 3 is a flow diagram illustrating how two devices 302 and 304 may establish a secure association or communication link using image-based authentication by a user. A public-private (cryptographic) key exchange may be implemented between a first device 302 and a second device 304 to establish a secure association. For instance, the first device A 302 may include a private key (or secret key) SKa 310 and generates a nonce (e.g., random number) Ra 314 which are then used to obtain a public key PKa 316 based on a first function f1 (i.e., PKa=f1 (SKa, Ra)). The public key PKa may then be sent 322 to the second device B 304 as part of a public-private key exchange, for example. Similarly, the second device B 304 may include a private key SKb 312 and generates a nonce (e.g., random number) Rb 318 which are then used to obtain a public key PKb 320 based on a second function f2 (i.e., PKb=f2 (SKb, Rb)). The public key PKb may then be sent 324 to the first device A 302. In this example, the first device A 302 is assumed to be the initiator of a communication link with the second device B (non-initiator) 304.

In one implementation, a commitment mechanism may be used to assist in thwarting a man-in-the-middle attack. After the first device A (initiator) 302 has sent its public key PKa to the second device B (non-initiator) 304, the second device B 304 computes a commitment value Cb based on a commitment function h and PKb, PKa, and Rb (i.e., Cb=h (PKb, PKa, Rb) 323. This commitment value Cb is sent to the first device A 325. Only after the commitment value Cb has been received by the first device A 302 does it send its nonce Ra 327 to the second device B. This prevents the second device B from changing its public key PKb and/or nonce Rb at a later stage when communicating with the first device A. The second device B 304 may also send its nonce Rb 329 to the first device A 302. The first device A 302 may independently confirm the commitment value Cb by using the same commitment function h and PKb, PKa, and Rb (i.e., Cb=h (PKb, PKa, Rb) 331.

In some implementations, a similar commitment mechanism may be used in which the first device A 302 computes a commitment value Ca based on PKa, PKb, and Ra) and sends it to the second device 304 before it receives the nonce Rb from the second device 304.

In order to prevent a man-in-the-middle attack, devices A 302 and B 304 may be further configured to perform a simple pairing authentication protocol. In one example, each device may generate a numeric confirmation value. That is, device A 302 may use a verification function g and one or more of the cryptographic keys PKa, PKb, Ra, and/or Rb to generate a confirmation value Vab(A) 326. Similarly, device B 304 may use the same verification function g and one or more of the cryptographic keys PKa, PKb, Ra, and/or Rb to generate a confirmation value Vab(B) 328. The verification function g may be pre-defined and/or arranged between the devices 302 and 304. Each device 302 and 304 may then obtain an image Img-A 330 and Img-B 332 based on their respective confirmation values Vab(A) and Vab(B). That is, device A 302 may map or convert its confirmation value Vab(A) to one or more images Img-A 330 using its image library 306. Similarly, device B 304 may map or convert its confirmation value Vab(B) to one or more images Img-B 332 using it image library 308. Each device 302 and 304 then displays its image Img-A 334 and Img-B 336 to the user. A user may then visually verify whether the two images Img-A and Img-B are the same or different 338. If the images Img-A and Img-B are the same, the user may accept an association between devices A 302 and B 304. If the images Img-A and Img-B are different, the user may decline an association between devices A 302 and B 304.

Figure 4:
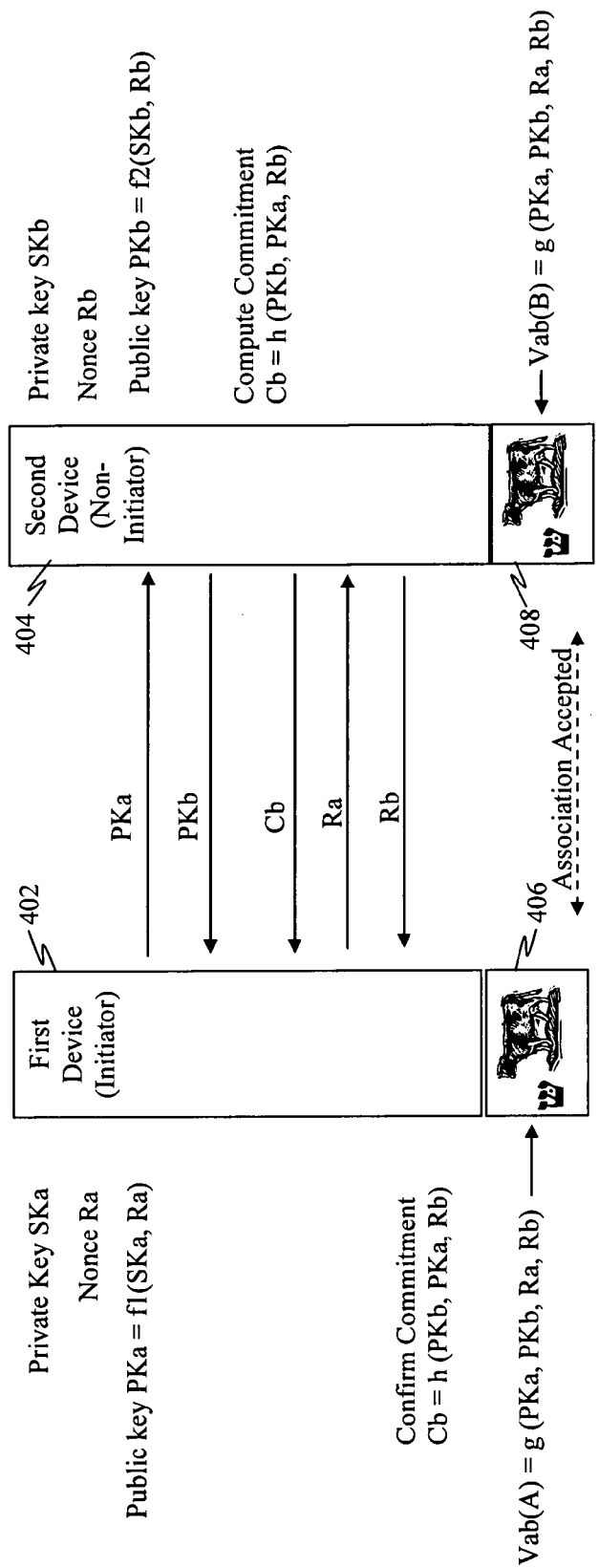
FIG. 4 illustrates an example in which image-based authentication is successfully used to confirm an association between two devices.

FIG. 4 illustrates an example in which image-based authentication is successfully used to confirm an association between two devices. The first and second devices 402 and 404 may function similar to the method described in FIG. 3 in which a cryptographic key exchange is performed between the devices with the first device 402 acting as the initiator of communications with the second device 404. Consequently, the first device 402 may have an associated private (secret) key SKa, a nonce (e.g., random number) Ra, and a public key PKa which may be function f1 of SKa and Ra (e.g., PKa=f1 (SKa, Ra)). Similarly, the second device 404 may have an associated private (secret) key SKb, a nonce (random number) Rb, and a public key PKb which may be function f2 of SKb and Rb (e.g., PKb=f2 (SKb, Rb)). The public keys PKa and PKb may be exchanged between the first and second devices 402 and 404. A commitment mechanism (as described in FIG. 3) may be employed where the non-initiator second device 404 computes a commitment value Cb based on PKb, PKa, and Rb and sends it to the first device 402. The first device 402 subsequently sends its nonce Ra to the second device 404 and receives the nonce Rb from the second device 404.

Each device 402 and 404 may then generate a confirmation number Vab(A) and Vab(B) as a function g of one or more of PKa, PKb, Ra, and/or Rb. Each device 402 and 404 may then map or convert their respective confirmation number Vab(A) and Vab(B) to one or more images 406 and 408. If both devices 402 and 404 hold the same cryptographic keys PKa and PKb and/or nonce (random numbers) Ra and Rb, then the images 406 and 408 will be the same. The user can easily verify the images 406 and 408 to confirm that they are the same and then accept the association between the first device 402 and the second device 404.

Figure 5:
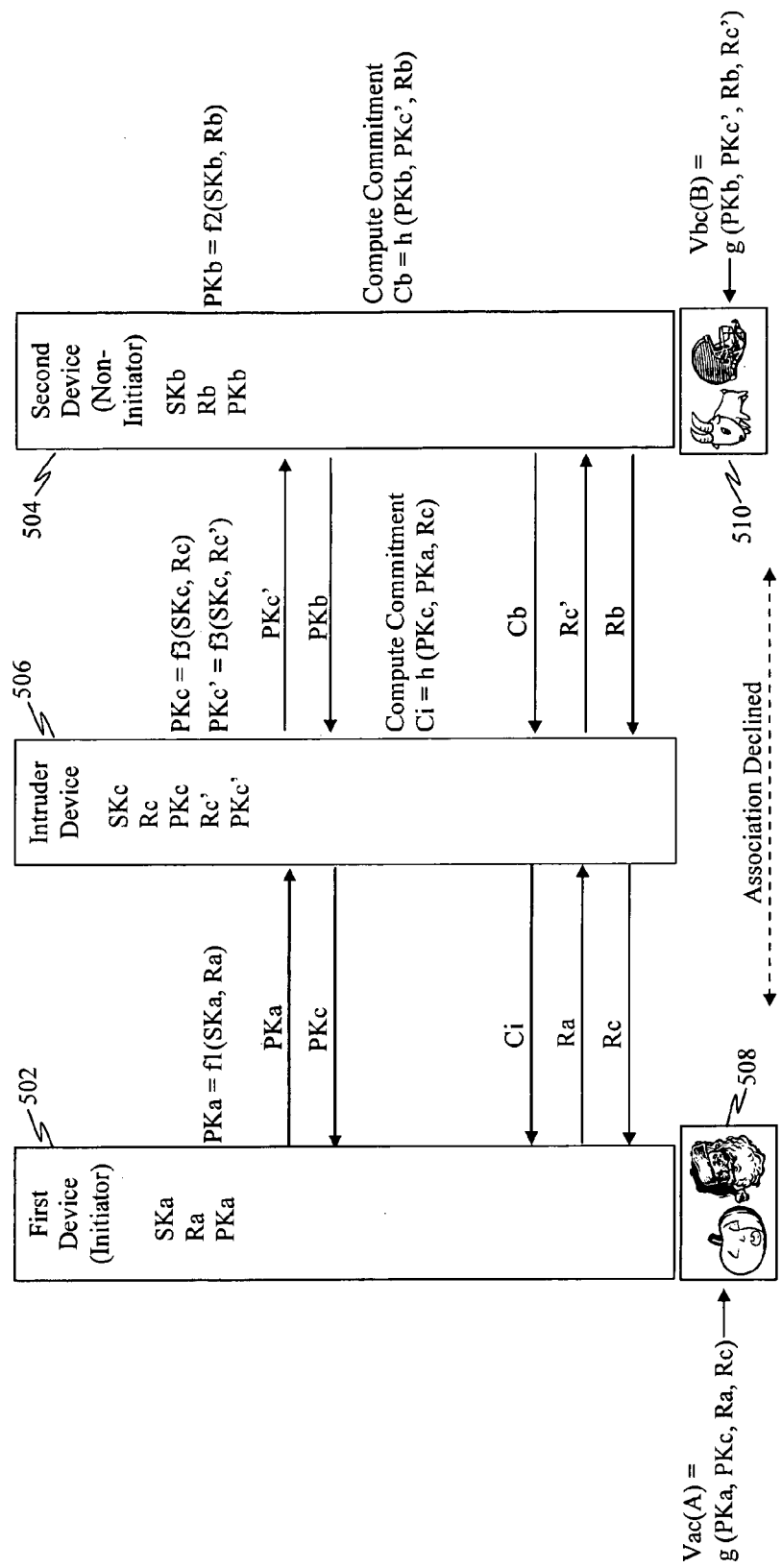
FIG. 5 illustrates a second example in which image-based authentication reveals a man-in-the-middle attack and allows a user to decline an association between two devices.

FIG. 5 illustrates a second example in which image-based authentication reveals a man-in-the-middle attack and allows a user to decline an association between two devices. An intruder device may mount an active man-in-the-middle attack by injecting itself between a first device 502 and a second device 504. The intruder device 506 may attempt to intercept information during a cryptographic key exchange between the first and second devices 502 and 504 and inject its own key(s) into the process.

For purposes of illustration, it is assumed that the first device 502 initiates a communication link or association with the second device 504. The commitment mechanism described in FIG. 3 forces the intruder device 506 to establish individual associations with the first and second devices using its own public keys PKc and PKc' and nonce Rc and Rc', respectively. The intruder device 506 establishes separate associations with the first and second devices 502 and 504. Because the commitment mechanism forces the intruder device 506 to first commit to at least one of its nonces (either Rc or Rc') before knowing both nonces Ra and Rb from the legitimate devices, the intruder device 506 is unable to merely act as a pass-through device.

For example, if the intruder device 506 first exchanges nonces (e.g., random numbers Rc' and Rb) with the non-initiating second device 504, it commits to its nonce Rc' before having obtained a nonce Ra from the initiating first device 502. Therefore, it cannot copy nonce Ra in its exchange with the second device 504 and is prevented from changing its nonce later. Conversely, if the intruder device 506 first exchanges nonces (e.g., Rc and Ra) with the initiating first device 502, it commits to a nonce Rc before obtaining a nonce Rb from the non-initiating device 504. In both cases, the intruder device 506 first commits to at least the second of its nonces before knowing the second nonce from the legitimate devices. It, therefore, cannot choose its own nonces in such a way as to cause the confirmation values to match.

Consequently, the first device 502 has knowledge of PKa, PKc, Ra, and Rc while the second device 504 has knowledge of PKb, PKc', Rb, and Rc'. The first confirmation value Vac (A) is a function g of PKa, PKc, Ra, and Rc (i.e., Vac(A)=g (PKa, PKc, Ra, Rc)) and will map or convert to a first image 508. The second confirmation value Vbc(B) is a function g of PKb, PKc', Rb, and Rc' (i.e., Vbc(B)=g (PKb, PKc', Rb, Rc')) and will map or convert to a second image 510. Note that confirmation values Vac(A) and Vbc(B) will be different even if the intruder device 506 uses the same value/number for its public keys PKc and PKc' and the same value/number for its nonce Rc and Rc'. Therefore, a user/operator can obviously and clearly see that the two images are different and can decline an association.

As the number of digits used for confirmation values may be increased to improve security, it may become more difficult and cumbersome for users to compare such long confirmation values. By using images rather than numbers, simple pairing and/or authentication protocols using numeric association models can be more user friendly and easier to verify.

Figure 6:
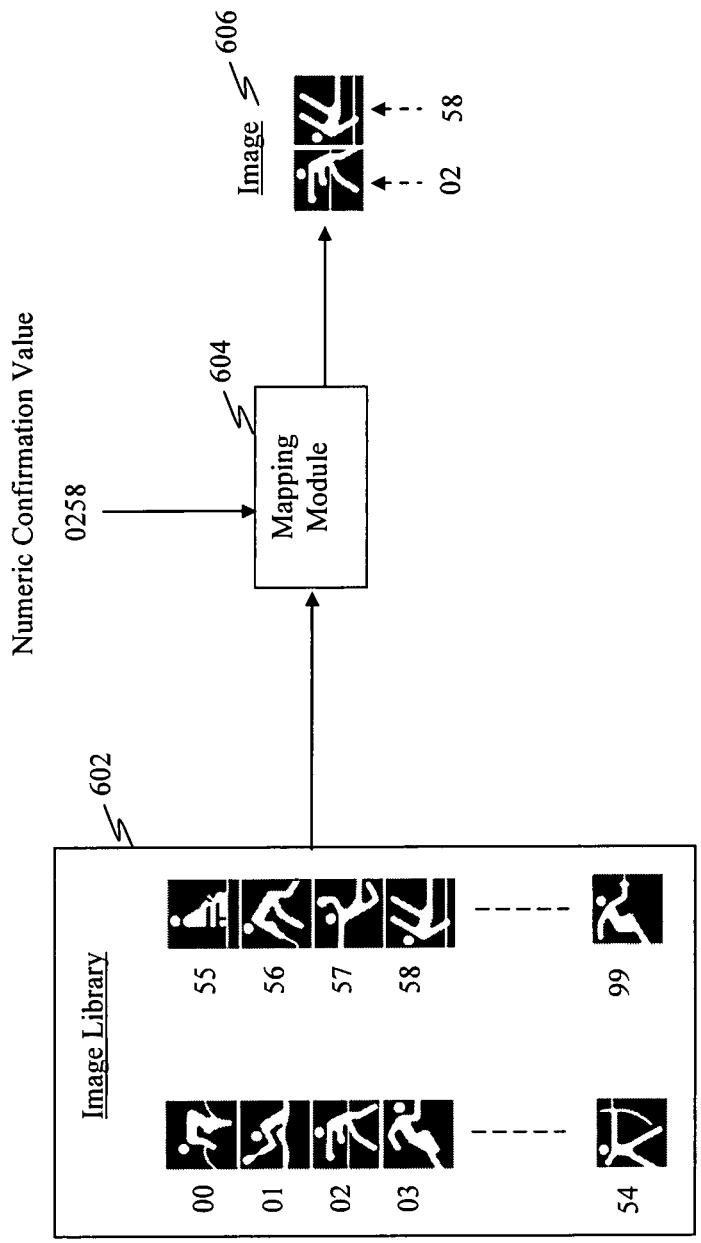
FIG. 6 is a block diagram illustrating one example of how numeric values may be mapped into one or more images.

FIG. 6 is a block diagram illustrating one example of how numeric (confirmation) values may be mapped into one or more images. A plurality of digits may be mapped into icons/images for easier recognition. For example, each icon/image in the image library 602 may represent a two-digit number. A mapping module 604 may thus convert a four-digit numeric confirmation value "0258" into two icons 606, where each icon may represent a two-digit combination.

Since each icon has a unique identity and associates with a specific sequence of two or more digits and/or alpha-numeric symbols, or a combination thereof, instead of comparing two numbers computed in the numeric association models, the user compares one or more images or icons. For example, the icon associated with the "00" combination shows an athlete that is riding a bicycle, while the "01" combination is associated with a tennis payer. Not only is each icon identified with a different sport, but also with a very distinct position of the athlete's body. Therefore, the confusion between these two icons is highly unlikely.

In various implementations, implementation, each sequence of digits (e.g., two, three, four, five, six, etc.) may be mapped to each image or icon. Consequently, the more digits that are mapped to each image, the fewer images that will be displayed to the user for comparison in a simple pairing process. Given the distinct graphic differences between the images in an image library, the process of comparison is significantly simplified.

Figure 7:
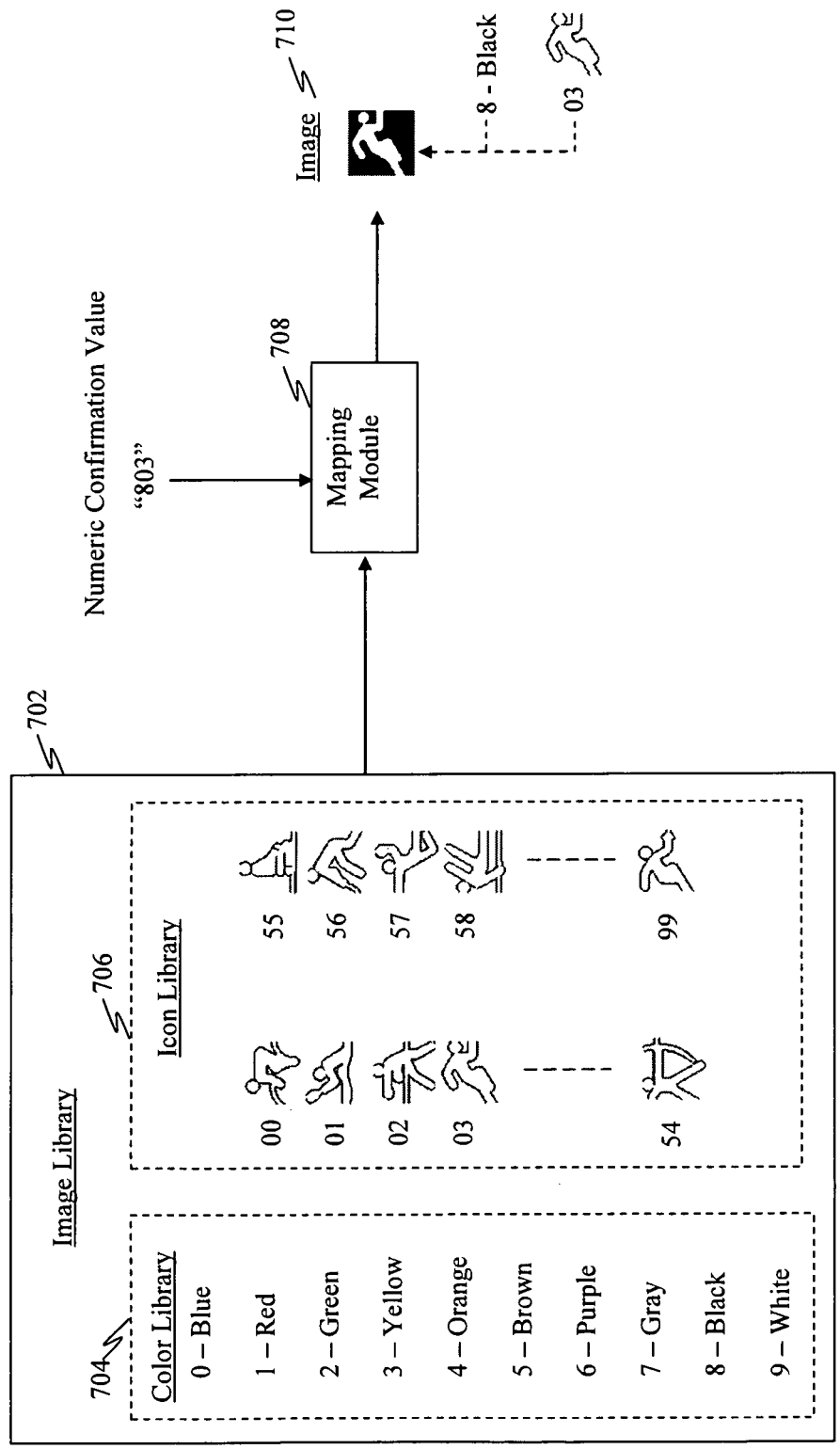
FIG. 7 is a block diagram illustrating another example of how numeric values may be mapped into one or more images and colors.

FIG. 7 is a block diagram illustrating another example of how numeric (confirmation) values may be mapped into one or more images and colors. In addition to using distinct images, color may also be introduced as part of the simple pairing comparison. That is, images used for confirmation may be matched both in shape and color for a successful authentication. The use of colors may be utilized as independent components, or as additional components, to the shape of images to be compared during pairing and authentication. This allows for a greater diversity in the image libraries and facilitates creating richer and easily distinctive images. Additionally, introducing colors to the image library increases the number of possible combinations available for the representation of longer numeric associations. Colors may also be used to reduce the size of an image library. For example, some of a numeric confirmation value may be mapped into colors while other digits may be mapped into images or icons.

An image library 702 may comprise an icon library 706 and a color library 704. In this example, digits zero through nine are mapped to ten different colors in the color library 704 and one hundred digits (00 through 99) are mapped to one hundred different icons in the icon library 706. In one example, a mapping module 708 may map the most significant digit of a three-digit confirmation number to the color library 704 while the remaining digits may be mapped to the icon library 706. For instance, for a numeric confirmation number "803", the mapping module may map the "8" to the color black (as defined by the color library) and map "03" to a runner icon so that the image 710 is the runner icon in black color. The combination of the color library and icon library permits representing up to one thousand (1000) images with just ten (10) colors and one hundred (100) icons.

Longer numeric confirmation values may be represented by two images. For instance, a six (6) digit number may be divided into the first three digits and the second three digits. Each three digit sequence may then be separately mapped to the image library such that the six digit number may be represented by two color icons.

Figure 8:
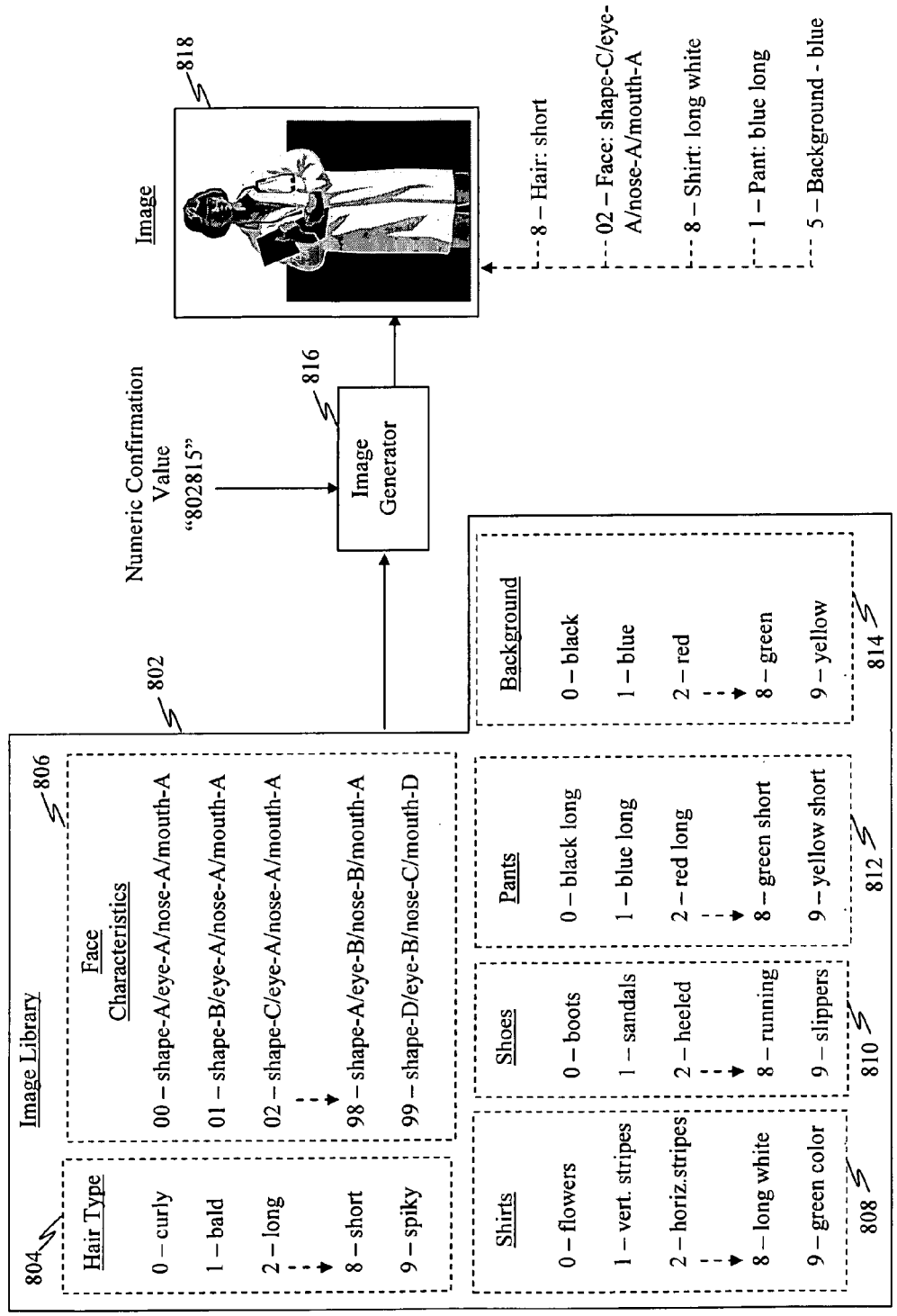
FIG. 8 is a block diagram illustrating an example of an image generation algorithm may be used to map numeric values to dynamically generated images.

FIG. 8 is a block diagram illustrating an example of an image generation algorithm may be used to map numeric values to dynamically generated images. Various algorithms may be used in generating an image that is unique for each possible confirmation value.

In one example, the image may be a graphical avatar or generated character based on a plurality of characteristics from an image library. For example, the image library 802 may include a plurality of sub-libraries such as a hair type library 804, a face characteristics library 806, a shirts library 808, a shoes library 810, a pants library 812, and/or a background library 814. Each of these sub-libraries may be used to map one or more digits of a numeric confirmation value by an image generator 816 to produce an image 818. For instance, a numeric confirmation value "802815" may cause the image generator 816 to map the first digit ("8") using the hair type library 804, map the second and third digits ("02") using the face characteristics library 806, map the fourth digit ("8") using the shirts library 808, map the fifth digit ("1") using the pants library 812, and map the sixth digit ("5") using the background library 814. In various implementations, the image generator 816 may have a pre-defined library assigned to each digit position or the library for each digit position may be varied (according to an algorithm) for each numeric confirmation value being mapped. Multiple other avatars and combinations of avatars with highly defined components may be implemented for easier and faster user recognition.

Another example of an avatar that can be used for comparison in association models is a face of a watch on the user's device where a position of each arm of the watch correspondents to a certain combination of the digits in the numeric confirmation value.

In yet other implementations, one or both devices which attempt to establish a secure communication link or association may not have a display. For instance, a device may be a headset, a remote control, a printer, or a small device that has no room on its surface for a display. Without a display on both devices, the user may have difficulty in authenticating the confirmation images. For such devices, the "confirmation images" may be audio images such as sounds and/or tones. That is, a confirmation value may be mapped into a tone, jingle, and/or some sound and emitted by each device. The user may then compare the audio images from the two devices to determine if an association should be accepted. For example, in the case of a hands-free headset for voice calls, a display is not present on the device. If an association between a mobile phone and the headset is attempted, an audio image may be used where an audio tone may be used to allow a user to confirm the association on both the mobile phone and the headset.

Figure 9:
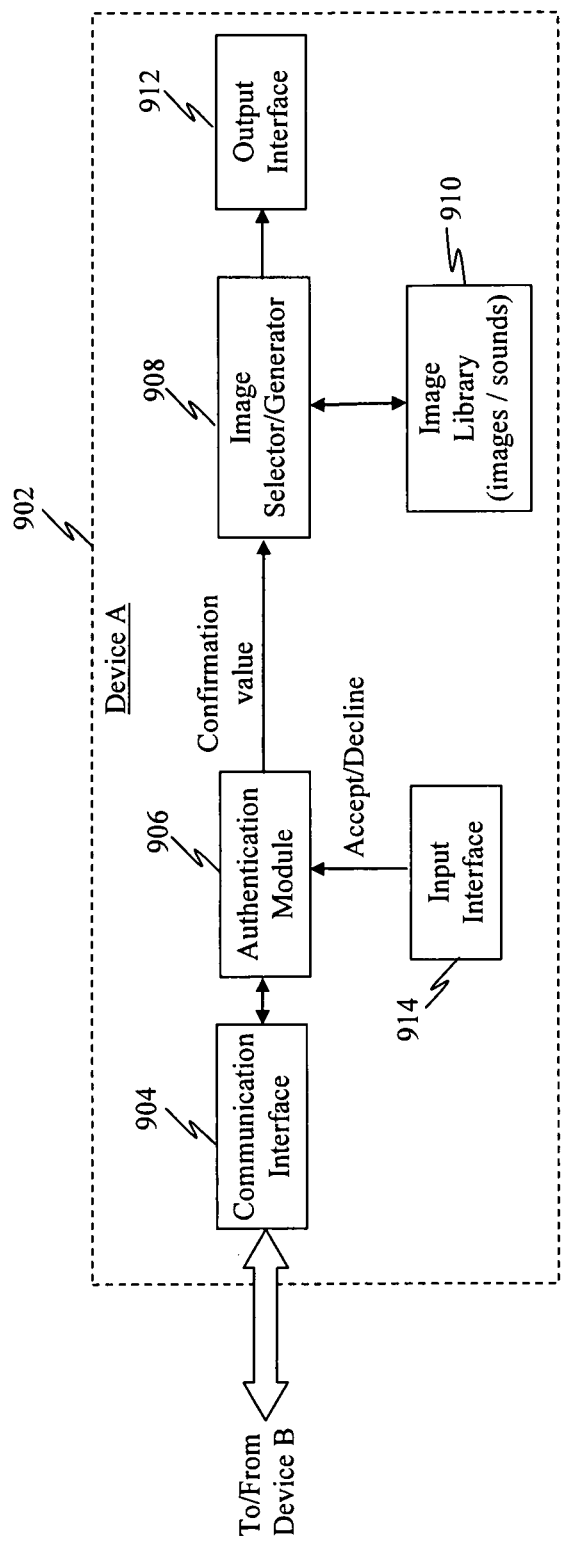
FIG. 9 is a block diagram illustrating logical components of a device adapted to perform image-based authentication.

FIG. 9 is a block diagram illustrating logical components of a device adapted to perform image-based authentication. The device 902 can be an initiator of a communication link or association or a non-initiator. The device 902 may include a communication interface with which it may communicate with a second device. For instance, the communication interface 904 may be a Bluetooth-compliant wireless interface. An authentication module 906 may be coupled with the communication interface 904 to receive one or more keys during a cryptographic operation (e.g., key exchange) to establish a secure communication link or association with the second device. For instance, the authentication module may perform a key exchange as illustrated in FIGS. 3 and 4.

The authentication module 906 may obtain a numeric confirmation value and send it to an image selector/generator 908 that converts and/or maps the numeric confirmation value using an image library 910 and outputs the selected/generated image to a user via an output interface 912 (e.g., display, audio speaker, etc.). Some examples of the operation of the image selector/generator 908 and image library 910 are shown in FIGS. 6, 7, and/or 8. The image selector/generator 908 may apply a collision-resistant function that prevents or inhibits generating the same authentication image using different numeric confirmation values. Each digit (or a combination of digits) of the computed numeric confirmation value may be represented by a symbol, icon, color, graphic, and/or sound that is exclusively assigned to that digit (or a combination of digits). Therefore, the resulting confirmation image is distinctly different and clearly distinguished from other images generated using different confirmation values.

A user, having confirmed the images present on both devices, can accept the device association (if the images are the same) or decline the device association (if the images are different) via an input interface 914.

One or more of the components in the device 902 may be implemented in one or more processors or processing circuits, and/or may be implemented in software. An "image" may any visual and/or audio representation that can be presented to a user. Regardless of their nature, the images may be highly distinct and each image uniquely represents a numeric digit or a sequence of digits.

Another level of security may be added by using a derivative of the confirmation value instead of the confirmation value itself. The derivative value may be a hash of the confirmation value, for example, and can be used to generate the confirmation image. Utilizing a derivative value rather than the actual confirmation value obtained in the real-time cryptographic key exchange may make it more difficult for a man-in-the-middle to determine the image-generating algorithm used to generate the confirmation image by using a sample of selected images.

In various implementations, a confirmation image may be generated from the whole numeric confirmation value or from one or more segments thereof. Depending on the implementation, the user may determine the part/segment(s) of the numeric confirmation value to be used in generating the analog image.

Additionally, a user and/or operator may also control whether confirmation images are displayed based on the class or type of device with which a communications link or association is sought. For example, different image libraries may be associated with or assigned to different classes of devices which may be determined based on device identifiers (e.g., exchanged while attempting to setup a communication link between devices).

The user or operator of a device may also control whether a confirmation image is displayed at all and may elect to display certain characteristics of a confirmation image while suppressing others. For example, the user may select a particular image library or type of images from which to select each part of the confirmation image. In another example, a user may optionally activate auditory authentication as part of the image where a set of audible tones uniquely associated with the computed numeric confirmation value is available in the image library.

Figure 10:
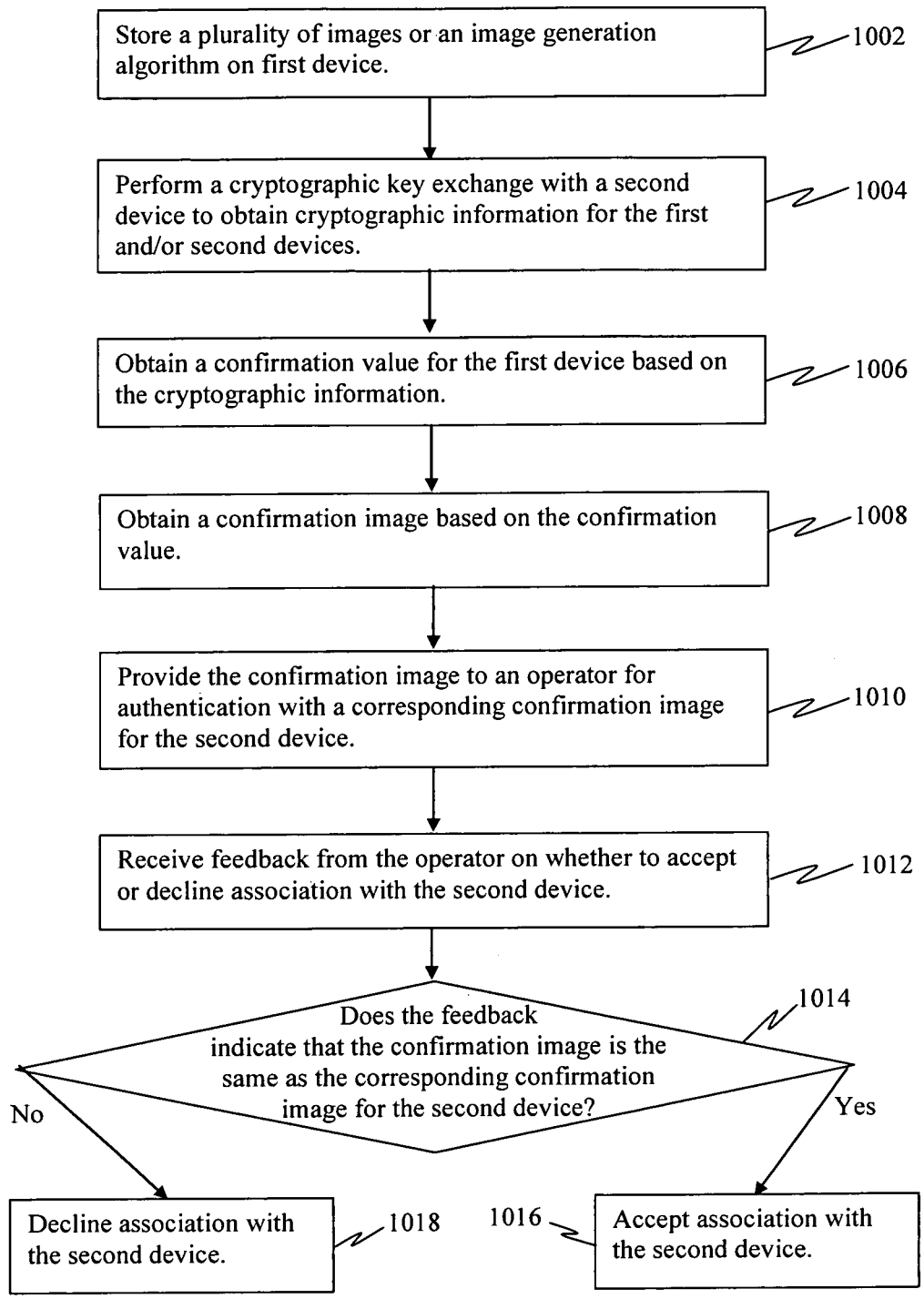
FIG. 10 is a flow diagram illustrating a method operational on a first device for facilitating image-based authentication of an association with a second device.

FIG. 10 is a flow diagram illustrating a method operational on a first device for facilitating image-based authentication of an association with a second device. In one example, the method may operate on a first device for securely establishing an association with the second device over a wireless communication link. A plurality of images and/or an image-generation algorithm may be stored in the first device 1002.

A cryptographic key exchange may be performed between the first device and a second device to obtain cryptographic information for the first and/or second devices 1004. For example, the first device may obtain a first public key and a first nonce for the first device and a second public key and a second nonce for the second device. As part of an authentication process, the first device may obtain/compute a confirmation value based on the cryptographic information 1006. The confirmation value may include at least one of a numeric value having a plurality of digits and an alpha-numeric sequence.

The first device may obtain (e.g., convert, map, compute, retrieve, etc.) a confirmation image based on the confirmation value 1008. For example, the confirmation value may be converted into the confirmation image by mapping one or more digits of the confirmation value to one or more of the plurality of images. Alternatively, the image-generation algorithm may generate the confirmation image based on the confirmation value. The image generation algorithm may combine one or more images, icons, colors, shapes, sounds, and backgrounds to generate the confirmation image. The confirmation image may also be based on a first derivative of the confirmation value. Obtaining the confirmation image based on the confirmation value may also include applying a collision-resistant function to generate the confirmation image, wherein the collision-resistant function inhibits generating the same image using different values. The confirmation image may also include at least one of icons, graphics, symbols, color, and sounds.

The confirmation image may be provided to an operator for authentication with a corresponding confirmation image for the second device 1010. For instance, the confirmation image may be provided via a display (for a visual image) or speaker (for an audio image). Feedback may be received from the operator on whether to accept or decline association with the second device 1012. The first device may determine whether the feedback indicates that the confirmation image is the same as the corresponding confirmation image for the second device 1014. If the confirmation image is the same as the corresponding confirmation image, the association with the second device is accepted 1016. Otherwise, the association with the second device is declined 1018.

In one implementation, the confirmation value may be mapped to a longitude and latitude. For instance the confirmation value may be divided into a longitude and latitude pair or it may be otherwise used to generate a (unique) longitude latitude pair. The longitude and latitude pair may then be used to obtain an image of the geographical location which is identified by the longitude and latitude. For instance, a mapping database (on the user device or external to the user device) may be accessed where the longitude and latitude are provided to obtain an image (e.g., map or satellite image) of the location corresponding to the longitude and latitude pair. The same procedure may be used by both devices to allow the user to authenticate the association between two devices. That is, the user compares the image of the location provided by a first device to an image of a location provided by a second device to determine whether the association should be accepted or declined.

In another implementation, the confirmation value may be mapped or converted into a search string (e.g., one or more search words, names, etc.) that is then used as an input to a search engine (e.g., Google™ or Yahoo™ search engines). The first webpage that is returned by the search engine can be used as the confirmation image. The same procedure may be used by both devices to allow the user to authenticate the association between two devices. That is, the user compares the image of a first website provided by a first device to an image provided by a second device to determine whether the association should be accepted or declined.

In an alternative implementation, the confirmation value may be uniquely mapped into a uniform resource locator (URL) or other address reference for content on a network. Consequently, different confirmation values would link to different URL or address reference for a network. The URL or address reference may link to an image on the network that serves as the confirmation image. This image may be sent to the device so that a user may compare it to a corresponding second confirmation image and decide whether an association should be accepted or declined. This may allow using a much larger database of images than may be stored on a user device and may also allow tailoring the images based on the display capabilities of the devices being associated.

According to one configuration, a circuit in a first device may be adapted to obtain store a plurality of images for an image library or an image-generation algorithm. The same circuit, a different circuit, or a second section of the same or different circuit may be adapted to perform a cryptographic key exchange with a second device to obtain cryptographic information for the first and/or second devices. In addition, the same circuit, a different circuit, or a third section of the same or different circuit may be adapted to obtain a confirmation value for the first device based on the cryptographic information. Similarly, the same circuit, a different circuit, or a fourth section may be adapted to obtain a confirmation image based on the confirmation value. A fifth section of the same or a different circuit may be adapted to provide the confirmation image to an operator for authentication with a corresponding confirmation image for the second device. A sixth section of the same or a different circuit may be adapted to receive feedback from the operator on whether to accept or decline association with the second device. A seventh section of the same or a different circuit may be adapted to either decline the association if the feedback indicates that the confirmation image is different than the corresponding confirmation image or accept the association if the feedback indicates that the confirmation image and corresponding confirmation image are the same. One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9 and/or 10 may be rearranged and/or combined into a single component, step, or function or embodied in several components, steps, or functions. Additional elements, components, steps, and/or functions may also be added. The apparatus, devices, and/or components illustrated in FIGS. 1, 2, 6, 7, 8, and/or 9 may be configured or adapted to perform one or more of the methods, features, or steps described in FIGS. 3, 4, 5 and/or 10. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the image selector/mapper/generator may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

The invention claimed is:

1. A method operational on a first device for securely establishing an association with a second device over a wireless communication link, comprising:
performing a cryptographic key exchange with the second device, wherein cryptographic information for the first and second device is obtained;
receiving a first commitment value from the second device;
generating a second commitment value at the first device;
determining that the received first commitment value is equal to or a function of the generated second commitment value to secure communications between the first device and the second device;
obtaining a confirmation value for the first device based on the cryptographic information after determining that the received first commitment value is equal to or the function of the second commitment value;
obtaining a confirmation image based on the confirmation value by dynamically generating the confirmation image by one or more of (a) generating a watch face based on different portions of the confirmation value or (b) mapping the confirmation value to a longitude and latitude pair, obtaining at least one of a map or image of a location associated with the longitude and latitude pair, and using the map or image of the location as the confirmation image; and
providing the confirmation image to an operator for authentication against a corresponding confirmation image for the second device.

2. The method of claim 1, further comprising:
storing a plurality of images in the first device, wherein the confirmation value is converted into the confirmation image by mapping a first set of digits of the confirmation value to a first image and mapping a second set of digits of the confirmation value to a second different image.

3. The method of claim 1, wherein the confirmation image is uniquely associated with the confirmation value.

4. The method of claim 1, wherein the cryptographic information includes at least one of a first public key associated with the first device, a first nonce associated with the first device, a second public key associated with the second device, and a second nonce associated with the second device.

5. The method of claim 1, wherein the confirmation image is based on a first derivative hash of the confirmation value.

6. The method of claim 1, wherein obtaining the confirmation image based on the confirmation value includes applying a collision-resistant function to generate the confirmation image, wherein the collision-resistant function inhibits generating the same image using different values.

7. The method of claim 1, wherein obtaining the confirmation image based on the confirmation value further includes:
converting the confirmation value into a search string;
inputting the search string into a search engine to obtain one or more search results including a plurality of webpages; and
utilizing at least a portion of a webpage from the plurality of webpages in the search results as the confirmation image.

8. The method of claim 1, wherein obtaining the confirmation image based on the confirmation value further includes:
converting at least a portion of the confirmation value into an address reference for content on a network, wherein the content includes an image;
obtaining the image associated with the address reference; and
utilizing the image as the confirmation image.

9. The method of claim 1, wherein performing the cryptographic key exchange with the second device includes:
obtaining a first public key based on a function of a first nonce associated with the first device;
transmitting the first public key to the second device;
receiving a second public key from the second device, the second public key based on a function of a second nonce associated with the second device; and
receiving the second nonce and the second commitment value from the second device.

10. The method of claim 1, wherein the first commitment value is a first nonce and the second commitment value is a second nonce.

11. The method of claim 1, wherein obtaining the confirmation image further comprises dynamically generating an avatar based on different portions of the confirmation value by mapping different portions of the confirmation value to different images.

12. The method of claim 11, wherein the avatar is dynamically generating by using different portions of the confirmation value to select one or more features for combining to form the avatar.

13. The method of claim 12, wherein the one or more features include facial features, clothing features and background features.

14. The method of claim 1, wherein obtaining the confirmation image further comprises combining distinct images of related subject matter into one or more pairs of related images by mapping different portions of the confirmation value to different images.

15. The method of claim 1, wherein obtaining the confirmation image further comprises mapping a first set of digits of the confirmation value to a plurality of colors and mapping a second set of digits of the confirmation value to a plurality of images by mapping different portions of the confirmation value to different images.

16. A first device to securely establish an association with a second device over a wireless communication link, the first device comprising:
    a wireless communication interface for communicating with the second device; and
    an authentication module configured to
        perform a cryptographic key exchange with the second device, wherein cryptographic information for the first device and second device is obtained,
        receive a first commitment value from the second device,
        generate a second commitment value at the first device,
        determine that the received first commitment value is equal to or a function of the generated second commitment value to secure communications between the first device and the second device,
        obtain a confirmation value based on the cryptographic information after determining that the received first commitment value is equal to or the function of the second commitment value,
        obtain a confirmation image based on the confirmation value by dynamically generating the confirmation image by one or more of (a) generating a watch face based on different portions of the confirmation value or (b) mapping the confirmation value to a longitude and latitude pair, obtaining at least one of a map or image of a location associated with the longitude and latitude pair, and using the map or image of the location as the confirmation image, and
        provide the confirmation image to an operator over an output interface for authentication against a corresponding confirmation image for the second device.

17. The first device of claim 16, further comprising:
    a storage device coupled to the authentication module, the storage device configured to store a plurality of images, wherein the confirmation value is converted into the confirmation image by mapping a first set of digits of the confirmation value to a first image and mapping a second set of digits of the confirmation value to a second different image.

18. The first device of claim 16, wherein the confirmation image is uniquely associated with the confirmation value.

19. The first device of claim 16, wherein the cryptographic information includes at least one of a first public key associated with the first device, a first nonce associated with the first device, a second public key associated with the second device, and a second nonce associated with the second device.

20. The first device of claim 16, wherein the confirmation image is based on a first derivative hash of the confirmation value.

21. The first device of claim 16, wherein the authentication module is further configured to:
    convert the confirmation value into a search string;
    input the search string into a search engine to obtain one or more search results including a plurality of webpages; and
    utilize at least a portion of a webpage from the plurality of webpages in the search results as the confirmation image.

22. The first device of claim 16, wherein the authentication module is further configured to:
    convert the confirmation value into an address reference for content on a network, wherein the content includes an image;
    obtain the image associated with the address reference; and
    utilize the image as the confirmation image.

23. The first device of claim 16, wherein the authentication module for performing the cryptographic key exchange with the second device is further configured to:
    obtain a first public key based on a function of a first nonce associated with the first device;
    transmit the first public key to the second device;
    receive a second public key from the second device, the second public key based on a function of a second nonce associated with the second device; and
    receive the second nonce and the second commitment value from the second device.

24. The first device of claim 16, wherein the first commitment value is a first nonce and the second commitment value is a second nonce.

25. The first device of claim 16, wherein the authentication module is further configured to obtain the confirmation image by dynamically generating an avatar based on different portions of the confirmation value by mapping different portions of the confirmation value to different images.

26. The first device of claim 25, wherein the authentication module dynamically generates the avatar by using different portions of the confirmation value to select one or more features for combining to form the avatar.

27. The first device of claim 26, wherein the one or more features include facial features, clothing features and background features.

28. The first device of claim 16, wherein the authentication module is further configured to obtain the confirmation image by combining distinct images of related subject matter into one or more pairs of related images by mapping different portions of the confirmation value to different images.

29. The first device of claim 16, wherein the authentication module is further configured to obtain the confirmation image by mapping a first set of digits of the confirmation value to a plurality of colors and mapping a second set of digits of the confirmation value to a plurality of images by mapping different portions of the confirmation value to different images.

30. A first device to securely establish an association with a second device over a wireless communication link, the first device comprising:
    means for communicating with the second device;
    means for performing a cryptographic key exchange with the second device, wherein cryptographic information for the first device and second device is obtained;
    means for receiving a first commitment value from the second device;
    means for generating a second commitment value at the first device;
    means for determining that the received first commitment value is equal to or a function of the generated second commitment value to secure communications between the first device and the second device;
    means for obtaining a confirmation value based on the cryptographic information after determining that the received first commitment value is equal to or the function of the second commitment value;
    means for obtaining a confirmation image based on the confirmation value by dynamically generating the confirmation image by one or more of (a) generating a watch face based on different portions of the confirmation value or (b) mapping the confirmation value to a longitude and latitude pair, obtaining at least one of a map or image of a location associated with the longitude and latitude pair, and using the map or image of the location as the confirmation image; and means for providing the confirmation image to an operator over an output interface for authentication against a corresponding confirmation image for the second device.

31. The first device of claim 30, further comprising:
means for storing a plurality of images, wherein the confirmation value is converted into the confirmation image by mapping a first set of digits of the confirmation value to a first image and mapping a second set of digits of the confirmation value to a second different image.

32. The first device of claim 30, wherein the confirmation image is uniquely associated with the confirmation value.

33. The first device of claim 30, wherein the means for obtaining the confirmation image further comprises means for dynamically generating an avatar based on different portions of the confirmation value by mapping different portions of the confirmation value to different images.

34. The first device of claim 33, wherein the means for dynamically generating the avatar uses different portions of the confirmation value to select one or more features for combining to form the avatar.

35. The first device of claim 34, wherein the one or more features include facial features, clothing features and background features.

36. The first device of claim 30, wherein the means for obtaining the confirmation image further comprises the means for combining distinct images of related subject matter into one or more pairs of related images by mapping different portions of the confirmation value to different images.

37. A computer program embodied in a non-transitory computer-readable medium operational on a first device for securely establishing an association with a second device over a wireless communication link, which when executed by a processor causes the processor to:
perform a cryptographic key exchange with the second device, wherein cryptographic information for the first device and second device is obtained;
receive a first commitment value from the second device;
generate a second commitment value at the first device;
determine that the received first commitment value is equal to or a function of the generated second commitment value to secure communications between the first device and the second device;
obtain a confirmation value based on the cryptographic information after determining that the received first commitment value is equal to or the function of the second commitment value;
obtain a confirmation image based on the confirmation value by dynamically generating the confirmation image by one or more of (a) generating a watch face based on different portions of the confirmation value or (b) mapping the confirmation value to a longitude and latitude pair, obtaining at least one of a map or image of a location associated with the longitude and latitude pair, and using the map or image of the location as the confirmation image; and
provide the confirmation image to an operator over an output interface for authentication against a corresponding confirmation image for the second device.

38. The computer program of claim 37, which when executed by the processor causes the processor to further:
store a plurality of images, wherein the confirmation value is converted into the confirmation image by mapping a first set of digits of the confirmation value to a first image and mapping a second set of digits of the confirmation value to a second different image.

39. The computer program of claim 37, wherein the confirmation image is uniquely associated with the confirmation value.

40. The computer program of claim 37, wherein the computer program causes the processor to further obtain the confirmation image by dynamically generating an avatar based on different portions of the confirmation value by mapping different portions of the confirmation value to different images.

41. A processing circuit for securely establishing an association with a second device over a wireless communication link, the processing circuit configured to:
perform a cryptographic key exchange with the second device, wherein cryptographic information for the processing circuit and second device is obtained;
receive a first commitment value from the second device;
generate a second commitment value at the processing circuit;
determine that the received first commitment value is equal to or a function of the generated second commitment value to secure communications between the processing circuit and the second device;
obtain a confirmation value based on the cryptographic information after determining that the received first commitment value is equal to or the function of the second commitment value;
obtain a confirmation image by dynamically generating the confirmation image by one or more of (a) generating a watch face based on different portions of the confirmation value or (b) mapping the confirmation value to a longitude and latitude pair, obtaining at least one of a map or image of a location associated with the longitude and latitude pair, and using the map or image of the location as the confirmation image; and
provide the confirmation image to an operator over an output interface for authentication against a corresponding confirmation image for the second device.

42. The processing circuit of claim 41 further configured to:
store a plurality of images, wherein the confirmation value is converted into the confirmation image by mapping a first set of digits of the confirmation value to a first image and mapping a second set of digits of the confirmation value to a second different image.

43. The processing circuit of claim 41, wherein the confirmation image is uniquely associated with the confirmation value.

44. The processing circuit of claim 41, wherein the processing circuit is further configured to obtain the confirmation image by dynamically generating an avatar based on different portions of the confirmation value by mapping different portions of the confirmation value to different images.

* * * * *